United States Patent [19]

Bahn et al.

[11] Patent Number: 5,194,795
[45] Date of Patent: Mar. 16, 1993

[54] DRIVE SYSTEM AND A CONTROL UNIT THEREFOR

[75] Inventors: Itsuki Bahn, Tokyo; Jiro Chiba, Yokohama, both of Japan

[73] Assignee: Sekogiken, Japan

[21] Appl. No.: 635,610

[22] PCT Filed: May 29, 1990

[86] PCT No.: PCT/JP90/00692

§ 371 Date: Feb. 11, 1991

§ 102(e) Date: Feb. 11, 1991

[87] PCT Pub. No.: WO90/15476

PCT Pub. Date: Dec. 13, 1990

[30] Foreign Application Priority Data

May 29, 1989 [JP] Japan .................. 1-132746

[51] Int. Cl.$^5$ .................. G05B 19/40; H02P 8/00
[52] U.S. Cl. .................. 318/685; 318/696; 318/254; 318/653
[58] Field of Search .............. 318/685, 696, 701, 254, 318/138, 653; 310/156

[56] References Cited

U.S. PATENT DOCUMENTS

| | | | |
|---|---|---|---|
| 3,444,447 | 5/1969 | Newell | 318/696 |
| 4,228,387 | 10/1980 | Brown | 318/696 |
| 4,469,995 | 9/1984 | Chiang et al. | 318/685 |
| 4,584,506 | 4/1986 | Kaszmann | 318/696 X |
| 4,591,774 | 5/1986 | Ferris et al. | 318/696 |
| 4,963,808 | 10/1990 | Torisawa et al. | 318/685 |
| 5,028,073 | 7/1991 | Harms et al. | 310/156 X |

Primary Examiner—Paul Ip
Attorney, Agent, or Firm—Staas & Halsey

[57] ABSTRACT

A drive system capable of driving a driven member with a large force and precisely rapidly positioning the same is disclosed, with use of a control unit for efficiently driving a motor with a large torque. Upon storage of target position data from a computer in a counter circuit of a driving mode switching circuit, the driven member is driven at a high speed with a large force via a ball screw/nut mechanism by the motor which efficiently operates as a two-phase reluctance motor at a high speed with large torque. When a count of the counter circuit, decremented with movement of the driven member, reaches a first preset value, supply of a sequence of position detection signals, indicative of the motor rotational position, to an energization control circuit is changed by a signal switching circuit, so that the motor is driven in the deceleration mode until its speed reaches a preset speed, and then the motor is driven at a constant speed. When the count decreases to a second preset value, the motor is driven as a stepping motor in accordance with a signal from a stepping signal generator. The motor is stopped when the count "0" is reached, and the driven member is precisely positioned to the target position.

14 Claims, 10 Drawing Sheets

DRIVE SYSTEM AND A CONTROL UNIT THEREFOR

TECHNICAL FIELD

The present invention relates to a drive system for driving a driven member and a control unit for use in the drive system, and more particularly, to a control unit capable of highly efficiently driving an electric motor at a high speed with high torque and of rapidly and precisely positioning the motor to a desired rotational position, and to a drive system capable of driving a driven member with a large driving force and of rapidly and precisely positioning the driven member by use of the control unit.

BACKGROUND ART

A conventional stepping motor is used exclusively to drive a lightweight load. If the conventional stepping motor is so designed as to drive a heavy load, it becomes large in size and hence the inertia thereof increases. In this case, a stepping operation of the motor requires a long time, so that the motor cannot be driven at a high speed. Further, a large electric power is required to start and stop the electric motor upon start and completion of the stepping operation, and hence the energy efficiency is lowed. In addition, if a stepping angle is set to a small value to enhance the precision of positioning in the conventional DC motor, the motor output torque is lowered.

SUMMARY OF THE INVENTION

An object of the present invention is to provide a control unit capable of highly efficiently driving an electric motor at a high speed with high torque and rapidly and precisely positioning the electric motor to a desired rotational position, and a drive system capable of driving a driven member with a large driving force and rapidly and precisely positioning the driven member by use of the control unit.

In order to attain the above object, according to one aspect of the present invention, a control unit is provided, which comprises a position detector for sequentially generating a series of position detection signals with rotation of a rotor of an electric motor; a stepping signal generator for sequentially generating a series of stepping signals; an energization control circuit for energizing and de-energizing exciting coils of the electric motor in response to corresponding ones of the position detection signals and the stepping signals; a driving mode switching circuit for switching a driving mode of the electric motor from a normal driving mode to a deceleration driving mode and then from the deceleration driving mode to a stepping driving mode; and a signal switching circuit for supplying the series of position detection signals in a normal sequence to the energization control circuit in the normal driving mode, supplying the series of position detection signals in a sequence different from the normal sequence to the energization control circuit in the deceleration driving mode, and interrupting supply of the series of position detection signals to the energization control circuit and sequentially supplying the series of stepping signals to the energization control circuit in the stepping driving mode.

According to another aspect of the present invention, a drive system is provided, which comprises an electric motor; a drive unit for driving a driven member with a driving force obtained by amplifying an output of the electric motor; and a control unit for controlling the electric motor; wherein the control unit includes the above-mentioned position detector, energization control circuit, driving mode switching circuit and signal switching circuit, and the driving mode switching circuit is operable to switch the driving mode in accordance with a remaining distance of the driven member to a target position.

Preferably, the drive unit includes a ball screw/nut mechanism. The position detector includes two position detection elements fixed on a stationary armature of the motor separately from each other, these position detection elements being operable to generate a series of position detection signals which are continuous with one another but not superposed on one another. Each position detection elements is disposed at that position at which the element is permitted to generate a position detection signal when an associated salient pole of a rotor enters a corresponding magnetic pole of an armature by a preset electric angle. The energization control circuit includes a chopper circuit for de-energizing an energized exciting coil when an exciting current flowing therethrough exceeds a preset value and energizing the de-energized exciting coil when a current flowing therethrough is reduced to a predetermined level. Further, the energization control circuit includes circuit means for supplying magnetic energy stored in the exciting coil to an exciting coil which is energized in response to a next position detection signal when the former exciting coil is de-energized in response to extinction of an associated position detection signal, and operates to cause the exciting current flowing in the de-energized exciting coil to rapidly fall and cause an exciting current flowing in the energized exciting coil to rapidly rise. The energization control circuit includes regeneration means for regenerating electric power, caused by a counter-electromotive force generated in the exciting coil which is in an energized state at the time of switching from the normal driving mode to the deceleration driving mode and by magnetic energy stored in the energized exciting coil, when such switching is made, to thereby brake the motor. The driving mode switching circuit includes a counter circuit for decrementing a count, supplied from a host control unit and indicative of the target position, each time a position detection signal is generated, and is operable to switch the driving mode from the normal driving mode to the deceleration driving mode when the count is reduced to a first preset value and from the deceleration driving mode to the stepping driving mode when the count is reduced to a second reset value, and interrupt the supply of the series of position detection signals to the energization control circuit when the count becomes "0" to thereby stop the motor. A chopper circuit of the energization control circuit is operable to de-energize an energized exciting coil when an exciting current flowing therethrough exceeds the second preset value after a rotation speed of the motor is reduced to a preset rotation speed in the deceleration driving mode, and energize the thus de-energized exciting coil again when a current flowing therethrough is reduced to a second predetermined value, so that the motor is driven at a predetermined rotation speed.

As described above, according to the present invention, the driving mode of the motor is switched from the normal driving mode where a series of position detection signals sequentially generated with rotation of the motor are supplied to the energization control circuit in a normal sequence to the deceleration driving mode where a series of position detection signals are supplied to the energization control circuit in a sequence different from the normal sequence, and is then switched to the stepping driving mode where the series of stepping signals sequentially generated are supplied to the energization control circuit, so that the exciting coils of the motor are energized and de-energized in response to the position detection signals or the stepping signals. Thus, the motor can be rapidly and precisely positioned to a desired rotational position. Further, since the driven member is driven by a driving force obtained by amplifying an output of the motor, and the driving mode of the motor serving as a driving source is switched from the normal driving mode to the deceleration driving mode and then to the stepping driving mode in accordance with a remaining distance of the driven member to the target position, the driven member can be rapidly and precisely positioned to the target position even when the driven member provides a heavy load.

Preferably, since a series of position detection signals are sequentially and continuously generated without being superposed on one another, the energization control circuit can be made simple in construction. Further, since the position detection signal is generated when a salient pole enters a magnetic pole by a preset electric angle, and magnetic energy stored in the exciting coil is supplied to an exciting coil which is energized by the next position detection signal when the former coil is de-energized in response to extinction of the position detection signal, the motor can be driven at a high speed, high torque and high efficiency. Since the exciting current is subjected to chopper control even when the switching from the normal driving mode to the deceleration driving mode is made, it is possible to prevent noise at the mode switching. Further, since electric power, associated with the counter-electromotive force and the stored magnetic energy, is regenerated when the mode switching is made, the motor can be rapidly decelerated by an electromagnetic braking effect.

BEST MODE OF CARRYING OUT THE INVENTION

Figure 1:
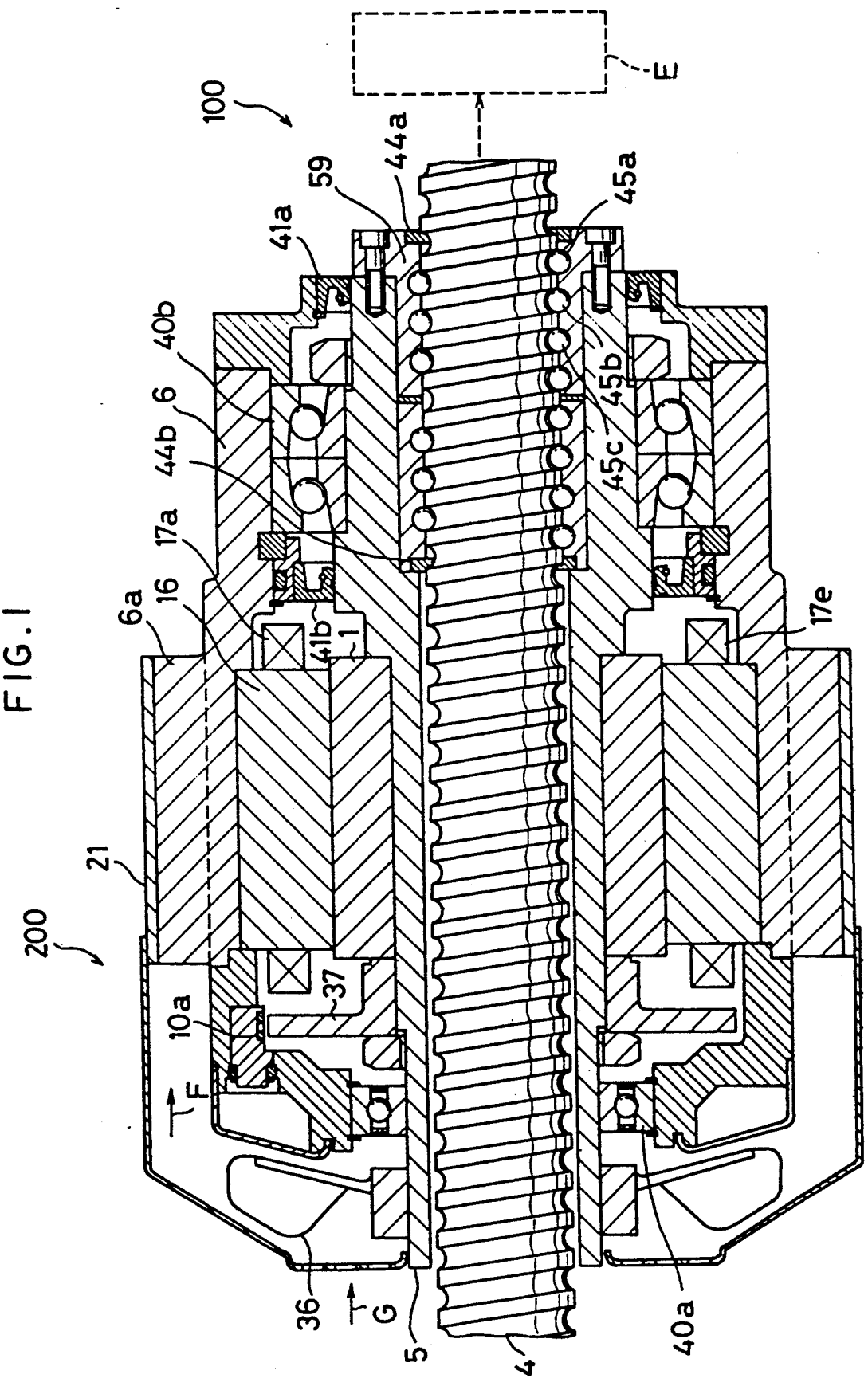
FIG. 1 is a longitudinal sectional view showing a ball screw-nut-mechanism and a motor of a drive system according to one embodiment of the present invention.

Referring to FIG. 1, a drive system of an embodiment of the present invention comprises a drive unit, composed of, e.g., a ball screw/nut mechanism 100, for driving a driven member (load) E, and a 2-phase reluctance motor 200 serving as a driving source for the drive unit.

The ball screw/nut mechanism 100 has a ball nut 59 fitted in a hollow rotary shaft 5 of the electric motor 200 and fixed to the rotary shaft 5 for rotation in unison therewith, and a ball screw 4 connected at one end to the driven member E and movably disposed in the hollow rotary shaft 5. Ball grooves are formed in an outer peripheral surface of the ball screw 4 and in an internal peripheral surface of the ball nut 59, so that balls 45a, 45b, may move and roll along the ball grooves. A ball circulating device (not shown) is attached to the ball screw/nut mechanism 100. The ball screw 4 is reciprocally movable in unison with the driven member E in the axial direction, with forward and reverse rotations of the ball nut 59 which is threadedly engaged with the ball screw 4 via the balls 45a, 45b. Reference numerals 44a and 44b denote oil seals interposed between the ball screw 4 and the ball nut 59.

Figure 2:
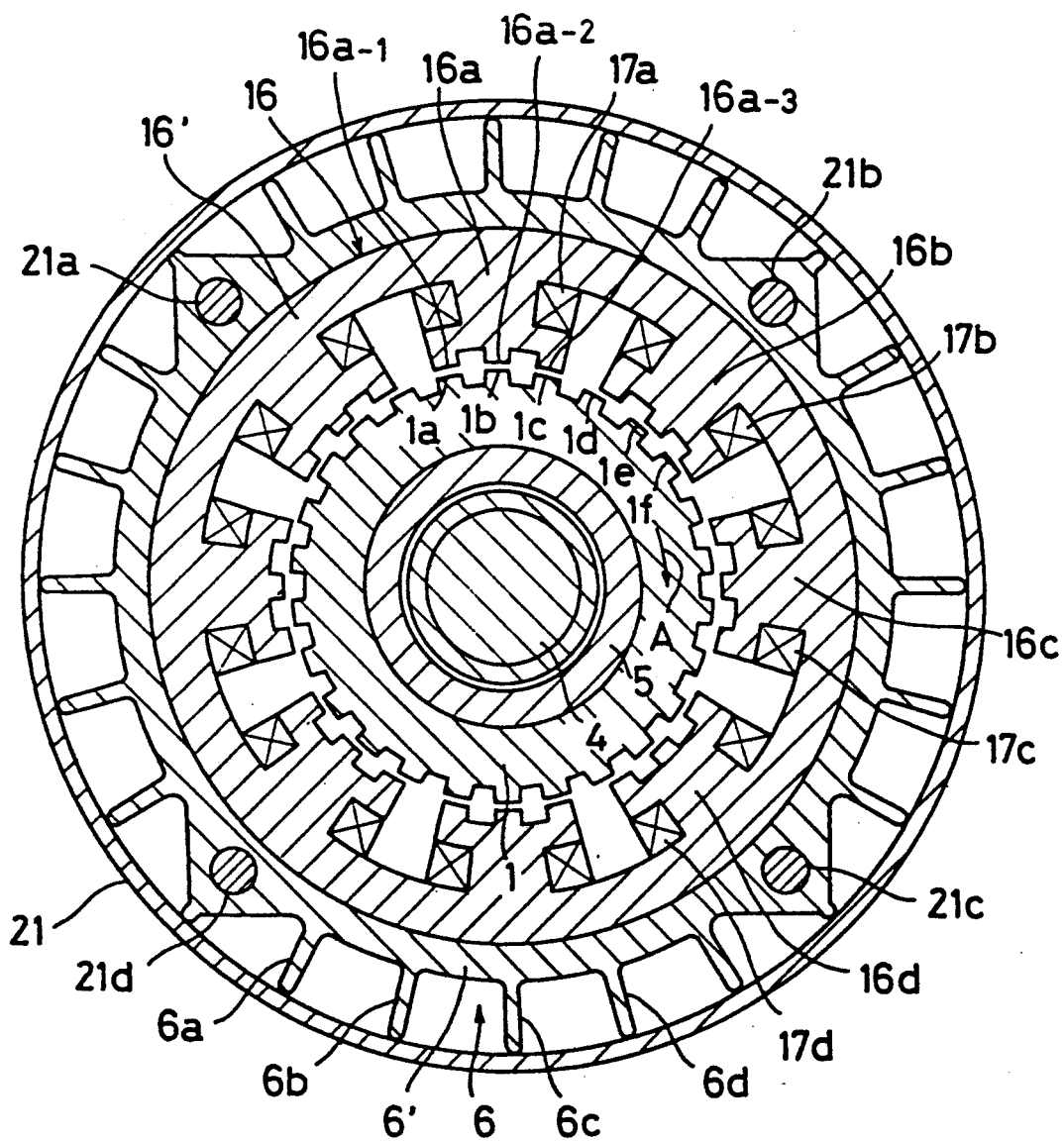
FIG. 2 is a cross sectional view of the motor.
Figure 3:
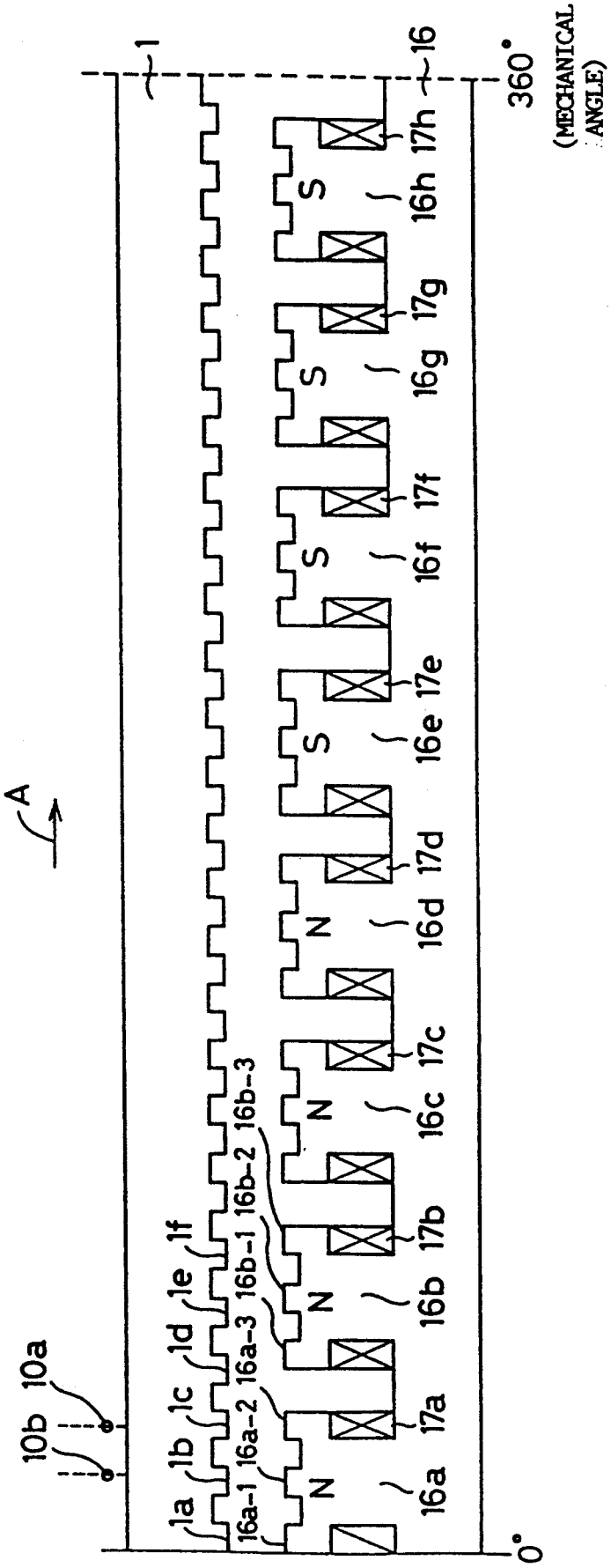
FIG. 3 is an exploded view of salient poles and magnetic poles of the motor and peripheral elements thereof.
Figure 4:
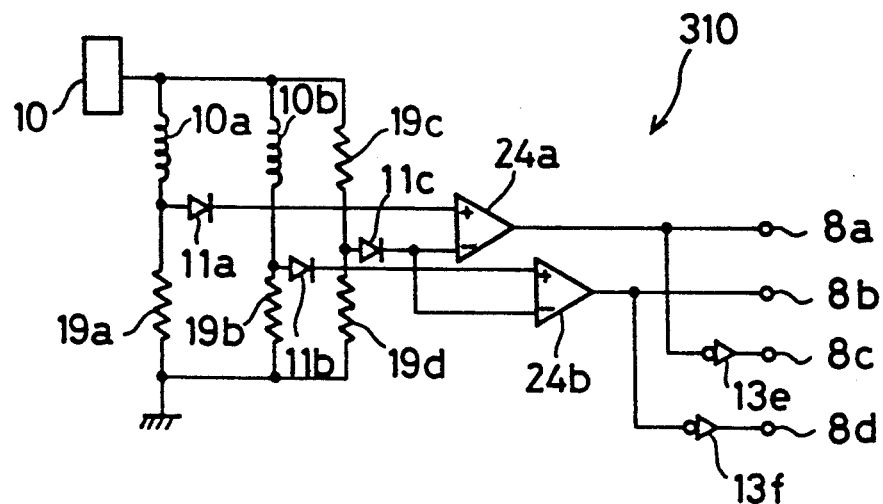
FIG. 4 is a circuit diagram showing the control unit and position detector of the drive system.

As shown in FIGS. 1 to 3, the motor 200 includes a cylindrical rotor 1 fitted on the hollow rotary shaft 5, and a cylindrical armature (stator) 16 disposed coaxially with the rotor. The rotor 1 and the armature 16 are each formed of a laminated body of silicon steel plates. A radiator 6, which is fitted on the armature 16, includes a cylindrical main body section 6' and cooling fins 6a, 6b, radially extending from the main body section, and is fixed, by means of screws 21a to 21d, to a cylindrical outer casing 21 which covers the radiator 6. The rotary shaft 5 is supported rotatably but axially immovably by means of ball bearings 40a and 40b interposed between the rotary shaft and the radiator 6. Oil seals 41a and 41b are disposed between the radiator 6 and the rotary shaft 5. A cooling fan 36 is fixed on one end of the rotary shaft 5, so that air is introduced into the interior of the motor as shown by an arrow G via an opening formed in an outer casing of the motor 200 with rotation of the cooling fan 36, and flows in a direction shown by an arrow F to pass through between the cooling fins 6a, 6b, to thereby cool magnetic coils and magnetic poles (described later) of the armature 16.

The rotor 1 is formed at its outer peripheral surface with salient poles 1a, 1b, disposed circumferentially at regular intervals with a phase difference of 360 degrees and each having a width corresponding to an electric angle of 180 degrees (hereinafter, various angle parameters are expressed in term of electric angle). The armature 16 has an annular magnetic core 16' along which a magnetic path is formed and which has an inner peripheral surface thereof formed with magnetic poles 16a, 16b, which are disposed at regular intervals in a circumferential direction. Three teeth (three teeth formed on the magnetic pole 16a are shown by reference numerals 16a-1, 16a-2 and 16c-3), each having a width of 180 degrees, are formed at regular intervals on an inner peripheral surface of each of the magnetic poles in a manner facing the salient poles 1a, 1b, with a space of approx. 0.1 to 0.2 mm. Exciting coils 17a, 17b, are fittedly mounted on the magnetic poles 16a, 16b, respectively. The exciting coils 17a and 17e are connected to each other in parallel or in series, and the thus connected pair is referred to as a first exciting coil pair K. Likewise, the exciting coils 17b and 17f, the exciting coils 17c and 17g, and the exciting coils 17d and 17h are respectively connected to each other in parallel or in series to constitute second, third and fourth exciting coil pairs L, M and N.

In order to attain the rotation oscillation preventing effect as will be described later, corresponding ones of the magnetic poles 16a, 16b, are arranged symmetrically with respect to the rotary shaft 5. Further, the opposite surfaces of the salient poles 1a, 1b, and the teeth 16a-1, 16l-2, of the magnetic pole have different widths in the rotary shaft direction so as to cause magnetic flux leakage between the opposite surfaces, to thereby make the output curve (described later) of the motor flat.

The drive system further includes a control unit for controlling the motor 200. As shown in FIGS. 4 to 7, the control unit includes a position detector 310 for detecting the rotational position of the rotor 1 of the motor, and a circuit 330 for switching the driving mode of the motor in accordance with a difference (a remaining distance to the target position) between the target moved position of the driven member E supplied from a host control unit and the actual moved position detected by the position detector. The control unit further includes a signal switching circuit 320 which responds to a switching signal from the driving mode switching circuit 330, and a circuit 340 for controlling energization and de-energization of the exciting coils of the motor in response to a switching signal supplied from the position detector 310 via the circuits 320 and 330. As will be described later, the control unit is operable to drive the motor 200 as a 2-phase reluctance motor with the maximum output torque, and decelerate the motor when the remaining distance to the target position of the driven member E has reached a first preset value. Whereupon, the control unit drives the motor at a constant speed of a predetermined rotation speed when the motor speed is reduced to the predetermined rotation speed, and then drives the motor as a 2-phase stepping motor when the remaining distance has reached a second preset value. Further, when the driven member E has reached the target position, the control unit operates to stop the drive of the motor, so that the driven member is positioned to the target position.

More specifically, the position detector 310 includes position detection elements 10a and 10b each composed of a flat air-core coil of approx. 100 turns and with a 4 mm diameter. The detection coils 10a and 10b are fixed on the armature 16 and separated from each other by an angle of (180+90) degrees and are disposed to face, with a gap, an outer peripheral surface of an aluminum disk 37 (FIG. 1) which is disposed for rotation in unison with the rotor 1. The disk 37 is circumferentially formed at its outer peripheral edge with protuberances at the same pitch as the salient poles, these protuberance corresponding in number to the salient poles and each having the same circumferential width as that of the salient poles 1a, 1b.

Further, the position detector 310 includes an oscillator 10 adapted for oscillation at a frequency of approx. 1 MHz. The oscillator 10 is connected to a bridge circuit composed of detection coils 10a and 10b and resistors 19a to 19d. The bridge circuit is connected to output terminals 8a to 8d of the detector through rectifying diodes 11a to 11c and through operational amplifiers 24a, 24b and inverter circuits 13e, 13f which are associated with the detection coils 10a and 10b. The bridge circuit is designed to be brought into the equilibrium state in which the levels of signals supplied to positive and negative input terminals of the operational amplifier 24a or 24b are equal to each other, when neither the detection coil 10a nor 10b faces any one of the protuberances of the disk 37 which correspond to the salient poles 1a, 1b, of the rotor 1. Further, the position detector 310 is operable to deliver a position detection signal from a corresponding one of its output terminals 8a to 8d each time the rotor 1 assumes that rotational position at which the detection coil 10a or 10b faces an associated protuberance of the disk.

More specifically, the diodes 11a, 11b have their anodes respectively connected to the connection nodes between the coils 10a, 10b and the resistors 19a, 19b, and the cathodes of these diodes 11a, 11b are respectively connected to the positive and negative input terminals of the operational amplifiers 24a, 24b. The diode 11c has its anode connected to the connection node between the resistors 19d and 19e, and the cathode thereof connected to the negative input terminals of operational amplifiers 13a and 13b. The output terminals of the operational amplifiers 24a and 24b are directly connected to the output terminals 8a and 8b of the position detector, and are connected via inverter circuits 13e and 13f to the output terminals 8c and 8d of the position detector.

Meanwhile, the position detector 310 may be additionally provided with a smoothing capacitor for enhancement of a rectification function of the diode. In case that the position detector is formed in an integrated circuit, however, it is preferable for the detector to contain no capacitor.

Figure 5:
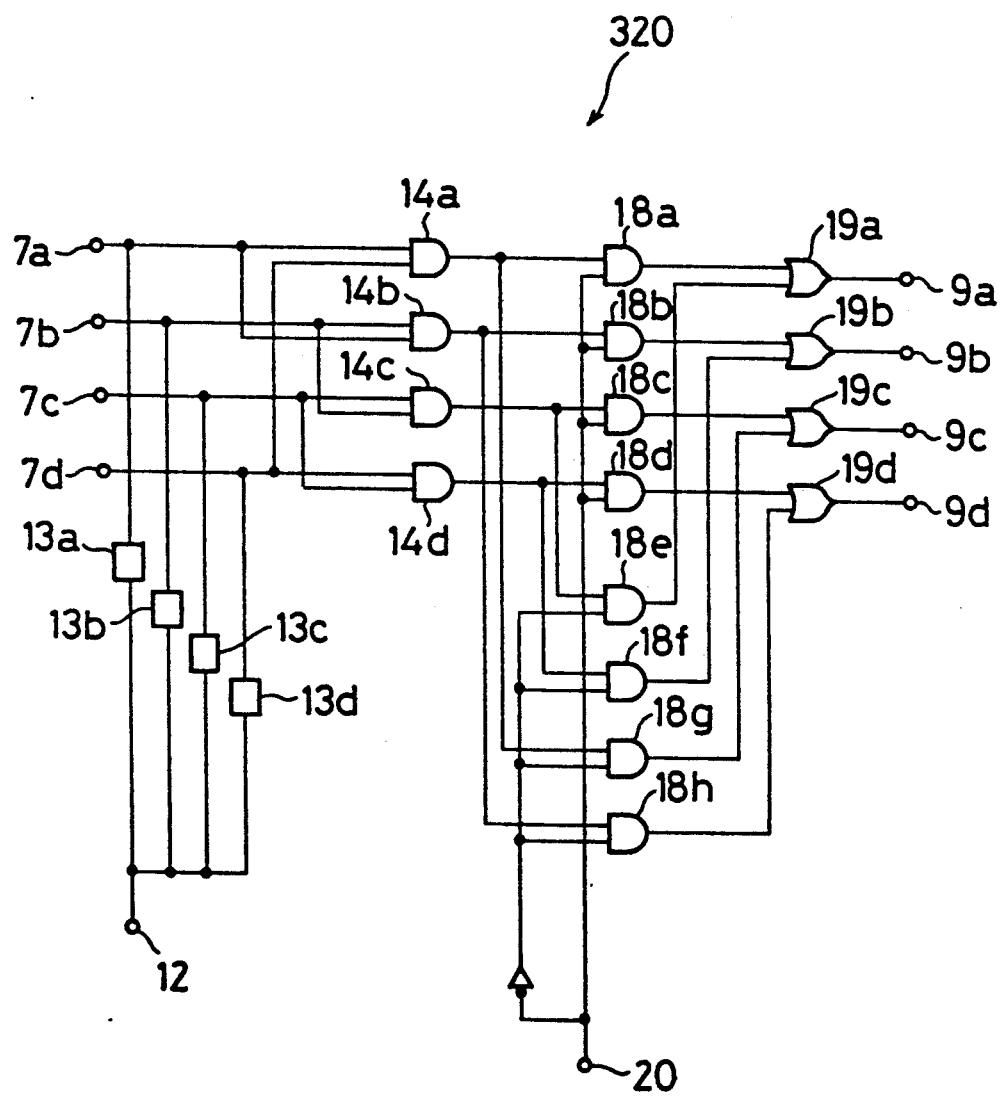
FIG. 5 is a circuit diagram showing a signal switching circuit of the control unit.

Referring to FIG. 5, the signal switching circuit 320 serves to supply position detection signals, supplied from the position detector and received at its input terminals 7a to 7d connected to the output terminals 8a to 8d of the position detector, from its output terminals 9a to 9d to the driving mode switching circuit 330 via logical product circuits (AND circuits) 14a to 14d and 18a to 18h and logical sum circuits (OR circuits) 19a to 19d. To this end, the signal switching circuit 320 enables the gates of and AND circuits 81a to 18d or the AND circuits 18e to 18h and disables the gates of the remaining AND circuits in accordance with the presence or absence of a switching signal from the circuit 330, to thereby switch the connection between the input/output terminals 7a to 7d and 9a to 9d. Further, the signal switching circuit 320 includes differentiating circuits 13a to 13d for generating differential pulses in response to the rise of an output signal from the position detector 310, so as to supply the differential pulse to the driving mode switching circuit 330.

More specifically, the input terminals 7a to 7d are respectively connected, on one hand, to input terminals of the differentiating circuits 13a to 13d and connected, on the other hand, to first input terminals of the AND circuits 14a to 14d, and further connected to the second input terminals of the AND circuits 14b to 14d and AND circuit 14a, respectively. Output terminals of the differentiating circuits 13a to 13d are connected to a differential pulse output terminal 12. Output terminals of the AND circuits 14a to 14d are respectively connected to first input terminals of the AND circuits 18a to 18d and respectively connected to first input terminals of the AND circuits 18g, 18h, 18e and 18f. Second input terminals of the AND circuits 18a to 18d are connected to a switching signal output terminal 20, and second input terminals of the AND circuits 18e to 18h are connected to the terminal 20 via an inverter. Output terminals of the AND circuits 18a to 18d and AND circuits 18e to 18h are respectively connected to first and second input terminals of the OR circuits 19a to 19d. Output terminals of the OR circuits 19a to 19d are respectively connected to the output terminals of the signal switching circuit 320.

Figure 6:
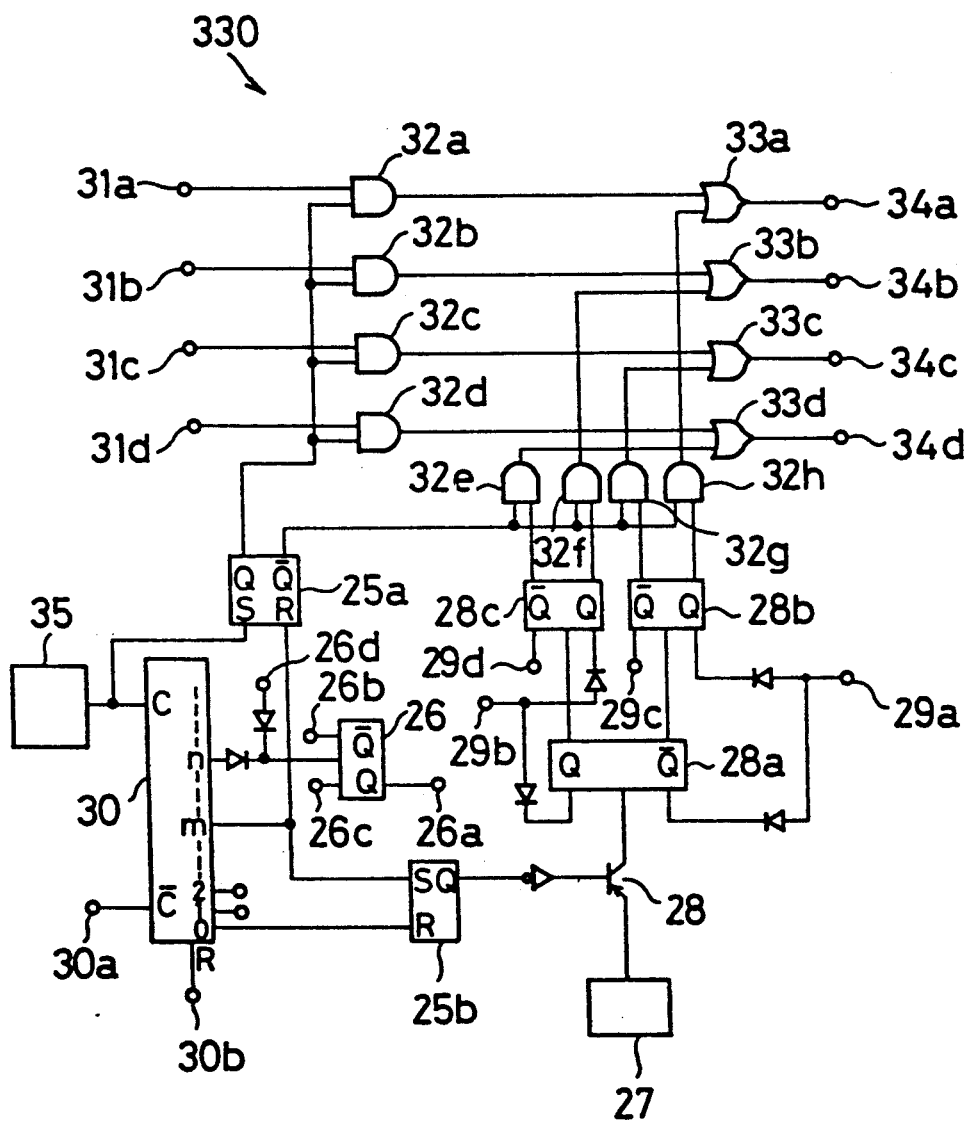
FIG. 6 is a circuit diagram showing a driving mode switching circuit of the control unit.

Referring to FIG. 6, the driving mode switching circuit 330 is arranged to supply position detection signals, supplied from the position detector 310 and received at its input terminals 31a to 31d respectively connected to the output terminals 9a to 9d of the signal switching circuit 320 via the circuit 320, from its output terminals 34a to 34d to the energization control circuit 340 via AND circuits 32a to 32d and OR circuits 33a to 33d. Further, the driving mode switching circuit 330 includes a stepping signal generator composed of a clock pulse generator 27 and JK flip-flop circuits (JKFF circuits) 28a to 28c, and is operable to supply stepping signals to the energization control circuit 340 via AND circuits 32e to 32h, OR circuits 33a to 33d and output terminals 34a to 34d. In order to selectively supply the position detection signal or stepping signal to the energization control circuit 340, the driving mode switching circuit 330 includes a gate control circuit section for control of enabling and disabling the gates of the AND circuits 32a to 32d and 32e to 32h. The gate control circuit section includes a counter circuit 30 for supplying a driving mode switching signal when the remaining distance to that target moved position of the driven member which is supplied from a computer 35 acting as a host control unit has reached a first or second preset value, and further includes a JKFF circuit 26 and flip-flop circuits (FF circuits) 25a and 25b.

More specifically, input terminals 31a to 31d of the mode switching circuit 330 are respectively connected to the first input terminals of the AND circuits 32a to 32d, and second input terminals and output terminals of the AND circuits 32a to 32d are respectively connected to a set output terminal Q of the FF circuit 25a and first input terminals of the OR circuits 33a to 33d. Second input terminals of the Or circuits 33a to 33d whose output terminals are connected to the output terminals 34a to 34d of the mode switching circuit are respectively connected to the output terminals of the AND circuits 32h, 32e, 32f and 32g. First input terminals of the AND circuits 32e to 32h are connected to a reset output terminal $\overline{Q}$ of the FF circuit 25a. The counter circuit 30 has a data input terminal C connected to the computer 35, a differential pulse input terminal C' connected to a terminal 30a which is connected to the differential pulse output terminal 12 of the signal switching circuit 320, and a reset pulse input terminal R connected to a terminal 30b which is in turn connected to the computer 35. Further, the counter circuit 30 has "0", "n" and "m" output terminals from which signals indicating that the count thereof is at "0", a first preset value "n" and a second preset value "m" are delivered. The data input terminal C and "m" output terminal are respectively connected to a set input terminal S and reset input terminal R of the FF circuit 25a.

Further, a clock input terminal of the JKFF circuit 26 whose set output terminal Q is connected to a terminal 26a which is in turn connected to the terminal 20 of the signal switching circuit 320 is connected to the "n" output terminal of the counter circuit 30 via a diode, and at the same time connected to a terminal 26d which is connected via another diode to a terminal 49a of the energization control circuit 340. First and second input terminals 26b and 26c of the FF circuit 26 are connected to the computer 35. A set output terminal Q of the FF circuit 25b whose set input terminal S and reset input terminal R are respectively connected to the "m" and "0" output terminals of the counter circuit 30 is connected via an inverter circuit to the base of a transistor 28 having an emitter connected to the clock pulse generator 27.

Further, first and second input terminals of the JKFF circuit 28a having a clock input terminal connected to the collector of the transistor 28 are respectively connected to terminals 29b and 29a via a diode, and a set output terminal Q and reset output terminal $\overline{Q}$ of the same JKFF circuit are connected to clock input terminals of the JKFF circuits 28c and 28b, respectively. A first input terminal of the FF circuit 28b is connected to the terminal 29a via a diode, a second input terminal thereof is connected to a terminal 29c, and the set output terminal Q and reset output terminal $\overline{Q}$ thereof are respectively connected to second input terminals of the AND circuits 32h and 32g. A first input terminal of the FF circuit 28c is connected to the terminal 29b via a diode, a second input terminal thereof is connected to a terminal 29d, and a set output terminal $\overline{Q}$ and reset output terminal $\overline{Q}$ thereof are respectively connected to second input terminals of the AND circuits 32f and 32e. The driving mode switching circuit 330 includes differentiating circuits (not shown) which are connected to the output terminals 34a to 34d of the same circuit for generating differential pulses in response to the rise of rectangular outputs from these output terminals, the differentiating circuits being connected to the terminals 29a to 29d.

Figure 7:
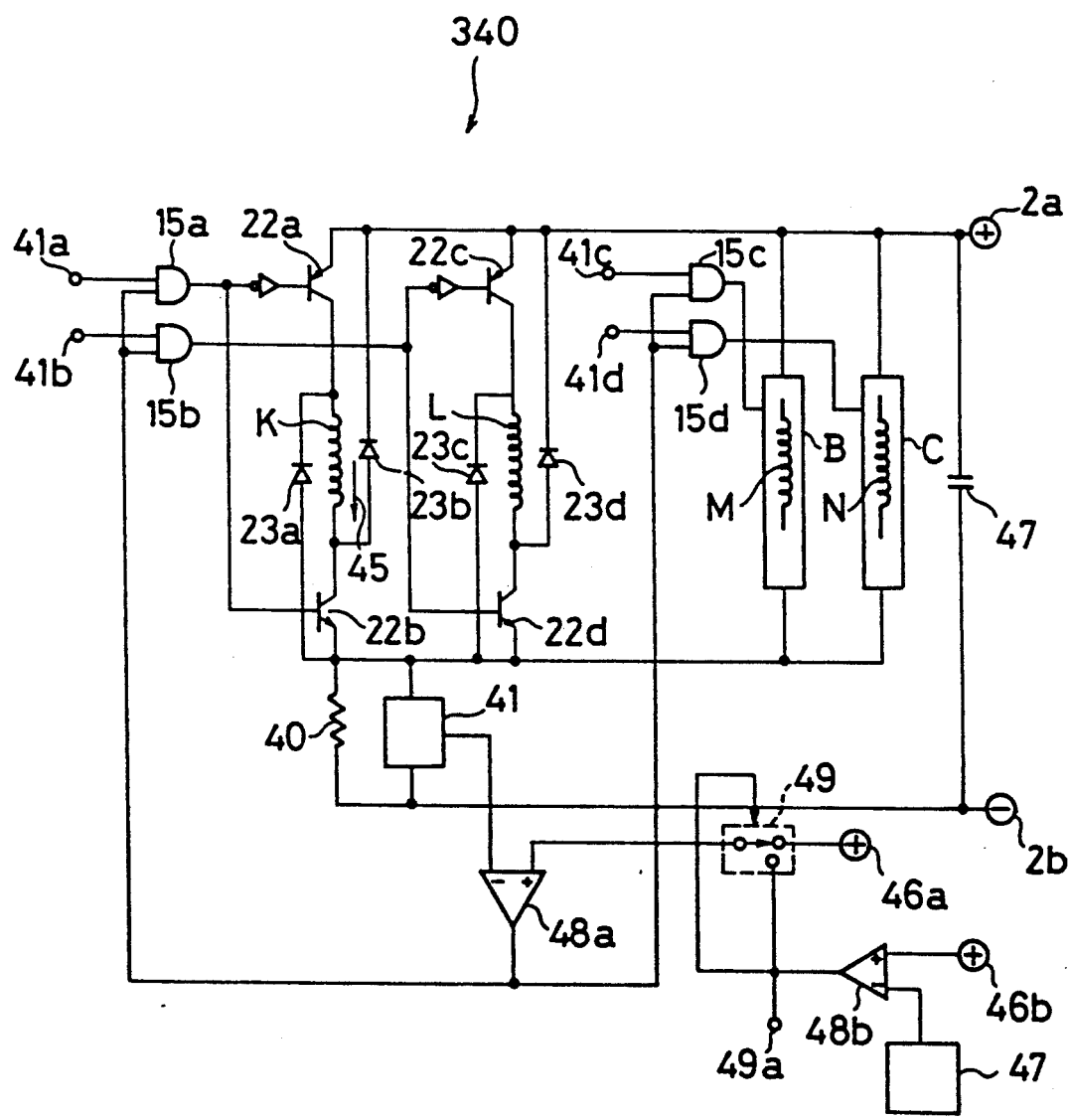
FIG. 7 is a circuit diagram showing an energization control circuit of the control unit.

Referring to FIG. 7, the energization control circuit 340 includes semiconductor switching devices, e.g., transistors, for making or braking the connection between a DC power source and the exciting coils of the motor 200, and diodes for effecting the stored magnetic energy feedback action as will be described later. The transistors associated with the first and second exciting coil pairs K and L are respectively denoted by reference numerals 22a, 22b and 22c, 22d, and the diodes associated with these coil pairs are denoted by reference numerals 23a, 23b and 23c, 23d. Blocks B and C schematically show the same construction associated with third and fourth exciting coil pairs M and N. Further, the energization control circuit 340 includes a chopper circuit for driving the motor 200 at a rotation speed determined in dependence on the driving mode. The chopper circuit includes AND circuits 15a to 15d and a first operational amplifier 48a.

More specifically, input terminals 41a to 41d of the energization control circuit 340 are connected, on one hand, to the output terminals 34a to 34d of the driving mode switching circuit 330, and are connected, on the other hand, to first input terminals of the AND circuits 15a to 15d of the energization control circuit. Output terminals of the AND circuits 15a to 15d are connected via inverter circuits to the bases of the transistors (e.g., transistors 22a and 22c) interposed between a positive terminal 2a of the DC power source and one-side ends of the first to fourth exciting coil pairs K to N, and are connected to the bases of the transistors (e.g., transistors 22b and 22d) interposed between the other ends of the first to fourth exciting coil pairs K to N and a resistor 40 which is connected to a negative terminal 2b of the DC power source. Each of the diodes 23a and 23c is interposed between one end of the exciting coil concerned and the emitter of the transistor concerned, and each of the diodes 23b and 23d is interposed between the other end of the corresponding exciting coil and the collector of the corresponding transistor. A capacitor 47 is connected between the positive and negative terminals 2a and 2b of the DC power source.

Further, a negative input terminal of the first operational amplifier 48a whose output terminal is connected to the second input terminals of the AND circuits 15a to 15d is connected to an absolute circuit 41 for detecting the absolute value of a voltage across the resistor 40 representative of the exciting current, and a positive input terminal thereof is connected to an output contact of an analog switch 49. A first input contact of the analog switch 49 is connected to a first reference voltage terminal 46a, and each of a second input contact and control input terminal thereof is connected to an output terminal and a terminal 49a of a second operational amplifier 48b. The terminal 49a is connected to the set output terminal 26a of the FF circuit 26 of the driving mode switching circuit 330. Further, a positive input terminal of the second operational amplifier 48b is connected to a second reference voltage terminal 46b, and a negative input terminal thereof is connected to a speed detector 47 for detecting the rotation speed of the motor 200.

Now, the operation of the above-mentioned drive system will be explained.

When a target moved position of the driven member E is read out from the program in which a procedure for driving the driven member E through the ball screw/nut mechanism is stated, the computer 35 supplies target moved position data to the counter circuit 30, and the counter circuit 30 stores the data therein. In the meantime, prior to this data storage operation, the computer 35 applies a reset pulse to the terminal 30b of the counter circuit 30 of the driving mode switching circuit 330, and a reset signal is supplied from the "0" output terminal of the counter circuit 30 to the R terminal of the FF circuit 25b accordingly. At this time, an "L" level signal appears on the Q output terminal of the FF circuit 25b to turn off the transistor 28.

At the time of supply of position data, the FF circuits 25a and 25b are set in response to an output signal from the computer 35. As a result, the gates of and AND circuits 32a to 32d of the mode switching circuit 330 are enabled. Also, an "H" level signal is supplied from the FF circuit 26 to the terminal 20 of the signal switching circuit 320 via the terminal 26a to render the gates of the AND circuits 18a to 18d to be enabled. As a result, the output terminals 8a to 8d of the position detector 310 are connected to the input terminals 31a to 31d of the circuit 330 in this order. That is, the forward rotation mode of the motor 200 is selected.

At this time, the analog switch 49 of the energization control circuit 340 is set in the switching position shown in FIG. 7, and thus an "H" level output from the first operational amplifier 48a which receives a first reference voltage from the terminal 46a at the positive input terminal is applied to the AND circuits 15a to 15d, so that the gates of the AND circuits are enabled. Also, the detection coil 10a or 10b of the position detector 310 faces any one of the protuberances (salient poles 1a, 1b, of the rotor 1) of the disk 37 of the motor. As a result, position detection signals associated with two of the first to fourth exciting coil pairs K to N are supplied to two of the AND circuits 15a to 15d to turn on the two sets of transistors for energization control associated with these two AND circuits, so that electric power is supplied to corresponding two of the exciting coil pairs from the DC power source 2a and 2b to rotate the motor 200 in the forward direction. With the forward rotation of the motor 200, the ball nut 59 of the ball screw/nut mechanism 100, fixed on the hollow rotary shaft 5 for rotation in unison with the rotor 1 of the motor, rotates in the forward direction, and the ball screw 4 threadedly engaged with the ball nut 59 moves in a forward axial direction together with the driven member E.

More specifically, at start of the motor 200, if position detection signals are supplied to, e.g., the input terminals 41b and 41c of the energization control circuit 340 to energize the second exciting coil pair L formed of the exciting coils 17b and 17f and the third exciting coil pair M formed of the exciting coils 17c and 17g, the salient poles 1d, 1e, 1f, of the rotor facing the teeth of the magnetic poles 16b, 16f, 16c and 16g are attracted, and hence the rotor 1 is rotated in the direction indicated by an arrow A in FIGS. 2 and 3. Thereafter, when the rotor 1 has rotated by 90 degrees, energization of the first exciting coil pair L is terminated, whereas the fourth exciting coil pair N formed of the exciting coils 17d and 17h is energized, so that the salient poles facing the teeth of the magnetic poles 16d and 16h are attracted to generate a rotation torque. The magnetic poles are magnetized so that the magnetic poles 16b and 16c acts as an N pole and the magnetic poles 16f and 16g acts as an S pole. In this way, since two excited magnetic poles always have opposite magnetic polarities, leakage magnetic fluxes pass through the non-excited magnetic poles in the opposite directions and therefore the counter torque caused by the leakage magnetic fluxes can be suppressed. At the time of next rotation of 90 degrees, the magnetic poles 16c and 16g are magnetized to the N and S poles and the magnetic poles 16d and 16h are magnetized to the N and S poles (FIG. 3). The polarities of the magnetic poles obtained for each rotation of 90 degrees are shown in FIG. 3. As the result, the rotor 1 rotates in the direction indicated by the arrow A.

Figure 8A:
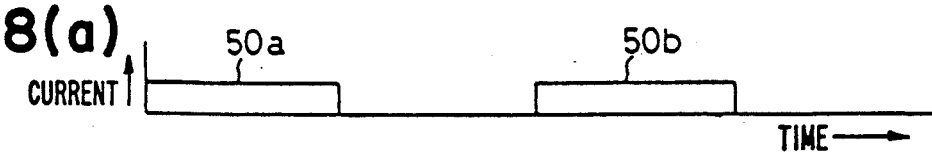
FIGS. 8(a)-8(i) are waveform diagrams showing the position detection signal and a torque curve of the motor.
Figure 8B:
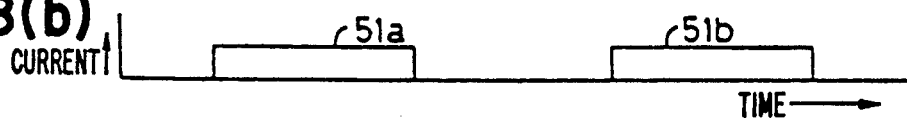
Figure 8C:
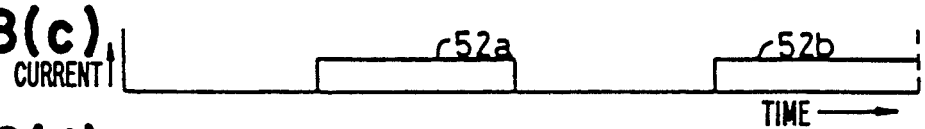
Figure 8D:
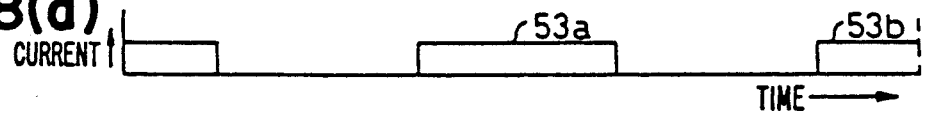
Figure 8E:
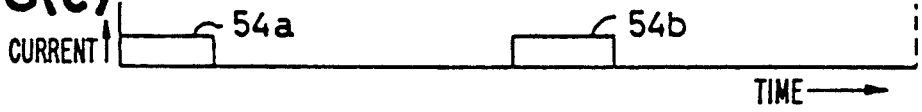
Figure 8F:
Figure 8G:
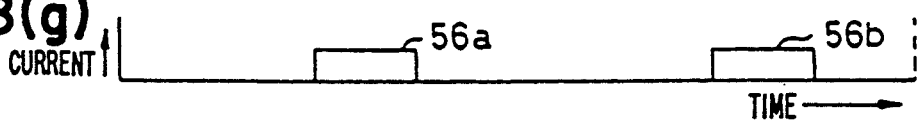
Figure 8H:
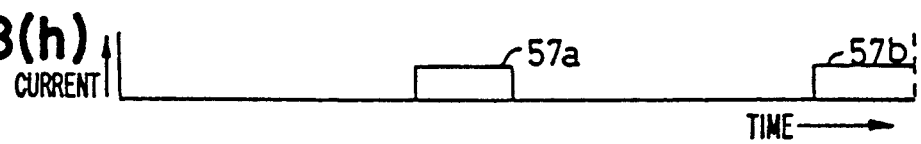
Figure 8I:
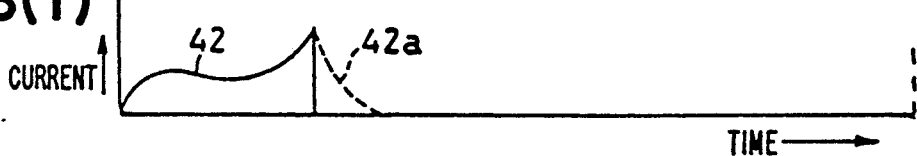

FIGS. 8(a)-8(i) show position detection signals generated in response to rotation of the rotor 1 and serving as timing signals for the above-mentioned energization control. In FIGS. 8(a) and 8(b), reference numerals 50a and 50b denote rectangular position detection signals supplied from the operational amplifier 24a in response to the detection operation of the detection coil 10a, and reference numerals 51a and 51b denote position detection signals supplied from the operational amplifier 24b in response to the detection operation of the detection coil 10b. The detection coils 10a and 10b are separated by an angle of (180+90) degrees, and the phase difference between the position detection signals 50a, 50b, and the position detection signals 51a, 51b, is 90 degrees. In FIGS. 8(c)-8(h), reference numerals 52a and 52b indicate position detection signals supplied from the inverter circuit 13e of the position detector 310, and reference numerals 53a and 53b indicate position detection signals supplied from the inverter circuit 13f. Reference numerals 54a and 54b indicate output signals supplied from the AND circuit 14a of the signal switching circuit 320, these output signals corresponding to superposed portion between the signals 50a, 50b and the signals 53a, 53b, and generated with a width of 90 degrees at intervals of 360 degrees. Further, reference numerals 55a and 55b indicate output signals from the AND circuit 14b, reference numerals 56a and 56b indicate output signals from the AND circuit 14c, and reference numerals 57a and 57b indicate output signals from the AND circuit 14d, respectively. As shown in FIG. 9(c) output signals 54a to 57a, of the AND circuits 14a to 14d are continuously generated without being superposed on one another on the time base, so that the exciting current is certainly generated upon start of the motor 200 to thereby stably start the motor, and that the construction of the energization control circuit 340 may be simplified.

Next, the feature of the operation of the motor 200 will be explained in more detail.

Figure 10:
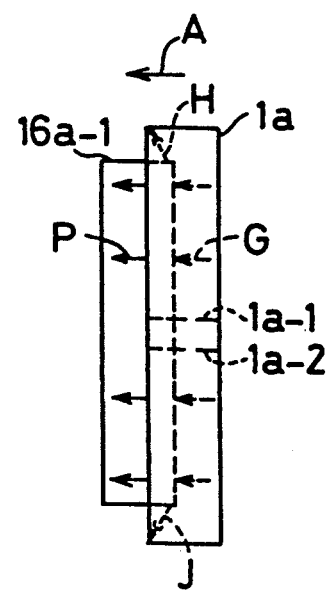
FIG. 10 is a diagram schematically showing a magnetic flux for causing the torque of the motor.

As described above, a pair of magnetic poles excited in phase, e.g., magnetic poles 16a and 16b, are arranged symmetrically with respect to the rotary shaft 5. Thus, a magnetic attractive force, which is caused between one of these magnetic poles and a corresponding salient pole, acts diametrically of the motor and does not contribute to generation of the output torque, balances with a similar magnetic attractive force associated with the other magnetic pole, so that no impact force caused by the magnetic forces will be applied from the rotary shaft to bearings concerned. Therefore, mechanical oscillation and noises which tend to occur in the conventional 2-phase reluctance motor may be prevented. Further, as shown by exciting current curves 58a to 58d in FIG. 9(c), adjacent magnetic pole exciting sections exceed 90 degrees, and magnetic attractive forces associated with these excitation sections are superposed on each other. As a result, mechanical noise will be reduced. Further, according to the conventional 2-phase reluctance motor, the torque generated at the initial energization stage in which the salient pole starts to face the magnetic pole is larger than the torque generated at the final energization stage in which the salient pole starts to be separated from the magnetic pole, as shown by the dotted line 43 in FIG. 8(j). Hence, the resultant torque for a pair of salient poles will contain pulsating components. In contrast, according to the motor of the present embodiment in which the facing surfaces of the salient pole and the magnetic pole have different widths in the rotary shaft direction so that leakage magnetic flux is generated between these facing surfaces as described above, a flat output torque characteristic can be obtained as shown by an output torque curve 43a in FIG. 8(j). That is, the magnetic fluxes which contribute to generation of the torque for driving, e.g., the salient pole 16a in the direction indicated by the arrow A are represented by arrows G, H, J and P in FIG. 10. The magnitude of the magnetic fluxes G and P is large in the initial stage in which the salient pole 1a starts to face the tooth 16a-1 and is small in the final stage in which the salient pole starts to be separated from the tooth. In other words, the output torque associated with the magnetic fluxes G and P varies with elapse of time as indicated by the dotted curve 43 in FIG. 8(j), whereas the magnitude of the magnetic fluxes H and J is small in the initial stage and large in the final stage. As a result, the output torque associated with the magnetic fluxes G, H, J and P becomes flat as shown by the curve 43a in FIG. 8(j).

Prior to a more detailed description of the operation of the control unit of the present embodiment, problems encountered in the conventional 2-phase reluctance motor will be discussed. First, the efficiency of the conventional motor is low. Namely, in the conventional motor, the exciting current is small in the initial stage of energization because of the inductance of the exciting coil, becomes smaller in the intermediate stage of energization because of the effect of the counter-electromotive force, and rapidly increases with time in the final stage of energization in which the counter-electromotive force is reduced (refer to an exciting current curve 42 in FIG. 8(j). In addition, a large exciting current in the final energization stage does not contribute to generation of the output torque and is dissipated as a Joule loss. Due to release of magnetic energy from the exciting coil after the termination of energization, a counter torque is caused by an exciting current which gradually falls as shown by the broken lines 42a in FIG. 8. Occurrence of the counter torque and Joule loss causes the efficiency to be lowered. Secondly, when an attempt is made to increase the output torque in the conventional motor, the rotation speed is significantly lowered. That is, if the number of salient poles and the number of teeth of the magnetic pole are increased in order to increase the output torque, rise and fall of the exciting current become dull because of the effect of magnetic energy stored between the magnetic pole and the salient pole. Therefore, the peak value of the exciting current is reduced and the counter torque is increased, thus lowering the rotation speed. Further, the frequency of entrance/exit of magnetic energy with respect to the magnetic pole in the reluctance motor is significantly larger than that of a 3-phase DC motor, also causing the rotation speed to be lowered. In addition, in a reluctance motor which has no field magnet, the deceleration driving of the motor and the electromagnetic braking or regenerative braking for stopping the motor cannot be effected.

Next, the operation of the control unit of this embodiment by which the aforementioned problems are eliminated will be explained.

Figure 9A:
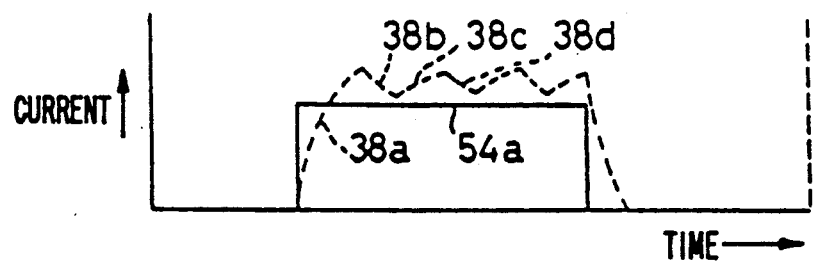
FIGS. 9(a)-9(c) are waveform diagrams showing the position detection signals and excitation current.

With reference to FIGS. 9(a), a chopper controlling function of the energization control circuit 340 will be first explained. During the energization of the exciting coil of each phase, e.g., while a position signal 54a is supplied to the input terminal 41a of the energization control circuit 340 to energize the first exciting coil pair K, an exciting current flows into the exciting coil pair K and rises as shown by broken lines 38a in FIG. 9(a). When the exciting current exceeds a preset value corresponding to a reference voltage, which is variably set and is supplied to the positive input terminal of the first operational amplifier 48a via the first reference voltage input terminal 46a and analog switch 49 of the energization control circuit, the operational amplifier 48a generates a low level output. As a result, the gate of the AND circuit 15a is disabled, thereby rendering the transistors 22a and 22b nonconductive. At this time, magnetic energy stored in the exciting coil pair K is discharged as a current flowing through the diode 23b, DC power source and diode 23a, thus feeding back the magnetic energy to the DC power source. The exciting current flowing at this time is shown by broken lines 38b in FIG. 9(a). The capacitor 47 serves to enhance the feedback of the magnetic energy into the DC power source.

Meanwhile, in case that a DC power source of a type rectifying an AC power is employed, the capacitor 47 has a smoothing function. Thereafter, when the exciting current is lowered to a predetermined value determined by a hysteresis characteristic of the operational amplifier 48a, an output of the operational amplifier is returned to a high level to render the transistors 22a and 22b conductive again, thus causing the exciting current to increase as shown by broken lines 38c. When the exciting current has increased to the preset value corresponding to the reference voltage again, the output of the operational amplifier is inverted to a low level, thereby turning off the transistors 22a and 22b. Then, the exciting current rapidly decreases upon extinction of the position detection signal 54a.

In this way, the first operational amplifier 48a cooperates with the AND circuit 15a to turn on or off the transistors 22a and 22b according to the relation in magnitude between the exciting current and the preset value determined by the reference voltage applied to the terminal 46a, thus controlling the exciting current or the output torque of the motor. The same operation is effected for the other exciting coil pairs. After all, the operational amplifier 48a functions as a chopper circuit in cooperation with the AND circuits 15a to 15d. In the meantime, if an output voltage of the DC power source is raised to make the rise and fall of the exciting current steeper so as to permit the motor 200 to rotate at a higher rotation speed, the chopper frequency may be increased but the output torque of the motor will not be influenced.

When the transistors 22a, 22b are changed from the conductive state to the nonconductive state in response to extinction of the position detection signal 54a and at the same time the position detection signal is supplied to the input terminal 41b to start energization of the exciting coil pair L, magnetic energy stored in the exciting coil pair K is converted into magnetic energy of the exciting coil pair L. As a result, the exciting current in the magnetic coil pair K rapidly falls so that the width of the exciting current falling section may become smaller than 45 degrees, whereas the exciting current in the exciting coil pair L rapidly rises. This makes it possible to prevent generation of a counter torque caused by a delay in the fall of the exciting current and reduction in the output torque (generation of reduced torque) caused by a delay in the rise of the exciting current. Further, the output voltage of the DC power source is so adjusted that the widths of the exciting current rising and falling sections are equal to each other, to thereby reduce the ripple component in the output torque of the motor. Also, the output voltage of the power source is set by taking a desired maximum rotation speed of the motor into consideration. Namely, because the duration of the position detection signal becomes short in high speed rotation, the power source voltage is set high if the maximum rotation speed is high. In this case, the exciting current will not increase even if the power source voltage is set high, thereby preventing the efficiency of the motor from being lowered. Moreover, to improve the efficiency of the motor, the mount positions of the detection coils 10a, 10b are so adjusted that the exciting coil is energized when the salient pole is rotated by 45 degrees from the time at which the salient pole enters the magnetic pole, or that the motor produces the maximum torque.

During the motor rotation, differential pulses are generated from the differentiation circuits 13a to 13d of the signal switching circuit 320 which receives a position detection signal from the position detector 310. Four differential pulses are generated for each rotation of 360 degrees of the rotor 1 of the motor. Hence, one differential pulse is generated each time the rotor 1 is rotated by 90 degrees. The differential pulse is supplied to the differential pulse input terminal C' of the counter circuit 30 of the driving mode switching circuit 330 via the terminal 12 of the switching circuit 320. As a result, each time the rotor 1 of the motor rotates through an angle of 90 degrees, the count of the counter 30 indicative of the remaining distance of the driven object E to the target moved position is decreased by "1".

When the count of the counter 30 is decreased to a first preset value "n" with rotation of the motor 200, the Q output of the JKFF circuit 26 is inverted to the "L" level in response to a signal supplied from the "n" output terminal of the circuit 30. The "L" level output is supplied to the terminal 20 of the signal switching circuit 320 via the terminal 26a. As the result, the gates of the AND circuits 18a to 18d of the circuit 320 are disabled, whereas the gates of the AND circuits 18e to 18h of the circuit 320 are enabled, so that the connection between the input and output terminals of the circuit 320 is switched. Namely, outputs from the AND circuits 14a to 14d of the switching circuit 320 are respectively supplied to the output terminals 9c, 9d, 9a and 9b of the circuit 320. As a result, the motor 200 is decelerated in the reverse rotation mode, thus lowering the rotation speed.

Upon transition from the forward rotation mode to the reverse rotation mode and thereafter, the aforementioned chopper control is performed. As a result, at the time of the transition to the reverse rotation mode, a large exciting current never flows in the same direction as the counter-electromotive force generated in the exciting coil pair, so that generation of impact noise and burning of the exciting coil can be prevented. The output torque of the motor generated in the deceleration operation is controlled in accordance with the reference voltage applied to the terminal 46a in the same manner as in the operation in the forward rotation mode. As explained above, the motor 200 is constructed to have the output torque characteristic indicated by the curve 43a to FIG. 8(j), and, in the operation in the reverse rotation mode, energization of the exciting coil is also started when the salient pole enters the magnetic pole by 45 degrees. For this reason, unlike the conventional reluctance motor in which the energization is started before the salient pole enters the magnetic pole so as to prevent generation of the counter torque, the output torque will not be significantly reduced.

In the reverse rotation mode, upon energization of, e.g., the coil pair K by the position detection signal 54a, a counter-electromotive force E, having a polarity shown by reference numeral 45 in FIG. 7, is generated with reduction of the magnetic flux intersecting the exciting coil pair K, and a voltage (V+E) equal to the sum of the DC power source voltage V and the counter-electromotive force E is applied to the exciting coil pair K. As a result, an exciting current flowing in the exciting coil pair K rapidly increases as shown by broken lines 39a. When the exciting current is increased to a preset value, the output of the first operational amplifier 48a is inverted to the "L" level to change the transistors 22a and 22b from the conductive state to the nonconductive state. As a result, as in the case of the forward rotation mode, a feedback current flows from the exciting coil pair K to the DC power source, to thereby feed back the magnetic energy stored in the exciting coil pair K to the DC power source. However, in contrast to the case of forward rotation mode, the feedback current flows in that direction which is not opposite to but is the same as the direction of the counter-electromotive force. In other words, application of the voltage (V+E) causes a feedback current to flow to the DC power source via the diodes 23a and 23b. Hence, the reduction rate of the feedback current with respect to time becomes smaller than that in the forward rotation mode, and the width of the current reducing section becomes large.

Figure 9B:
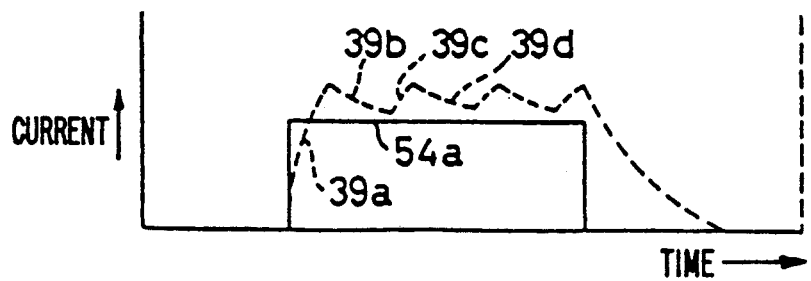
Figure 9C:
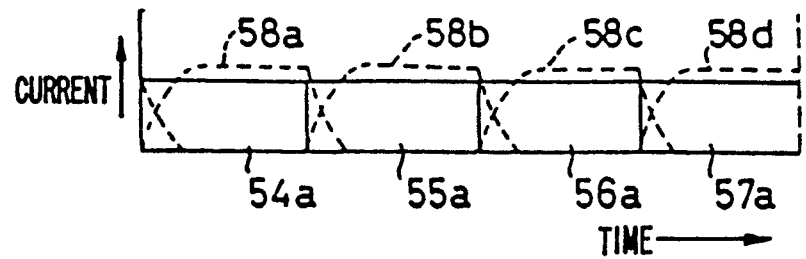

After the turn-off of the transistors (22a and 22b, when the exciting current is reduced as shown by broken lines 39b in FIG. 9(b) to reach a preset value, the output of the first operational amplifier 48a is inverted to the "H" level to turn on the transistor again, so that the exciting current will increase as shown by broken lines 39c. In this manner, the chopper control is effected in the reverse rotation mode in substantially the same manner as in the forward rotation mode. Although the power is dissipated in the current increasing sections corresponding to the broken lines 39a, 39c, ..., the power dissipation therein is small because the widths of the current increasing sections are smaller than those in the forward rotation mode corresponding to the broken lines 39a, 39c, .... In the current decreasing sections corresponding to the broken lines 39b, 39d, ..., rotation energy of the rotor 1 of the motor and the driven member (load) E is converted into electric power and fed back to the DC power sources 2a and 2b. Since the width of the current decreasing section is large, preferable braking can be effected. In the case of the DC power source constituted by a battery, the battery can be changed by regenerative electric power. In the case of the DC power where AC power is rectified, the regenerative electric power is supplied to an AC power source via a converter. Further, in case that another motor, illuminator or electric heater is connected between the power source terminals 2a and 2b, the regenerative power is supplied to the motor or the electric appliance.

Thereafter, when the rotation speed of the motor is lowered to a preset rotation speed by the above-described deceleration operation so that the second reference voltage applied to the terminal 46b has exceeded the output of the speed detector 47, and "H" level output is supplied from the second operational amplifier 48b of the energization control circuit 340. In response to this operational amplifier output, the analog switch 49 is so switched as to connect the output terminal of the second operational amplifier 48b to the positive input terminal of the first operational amplifier 48a. Further, the "H" level output of the second operational amplifier 48b is supplied to the JKFF circuit 26 via the terminal 26d of the driving mode switching circuit 330 connected to the terminal 49a of the energization control circuit 340, so as to invert the Q output of the FF circuit 26 to an "L" level. As a result, the driving mode of the motor 200 is switched to the forward rotation mode. In this case, the first and second operational amplifiers 48a and 48b function as an error amplifying circuit and a comparator circuit, respectively. As a result, the rotation speed of the motor is restricted up to a speed corresponding to the second reference voltage applied to the terminal 46b of the energization control circuit 340. This is, the motor is driven at a constant speed.

Thereafter, when the count of the counter circuit 30 is decreased to the second preset value "m", the Q output and $\overline{Q}$ output of the FF circuit 25a are respectively inverted to the "L" and "H" levels in response to a signal supplied from the "m" output terminal of the counter circuit 30 to the reset input terminal R. As a result, the gates of the AND circuits 32a to 32d of the driving mode switching circuit 330 are disabled to prevent the position detection signal from being supplied to the energization control circuit 340 via the switching circuit 330, and the gates of the AND circuits 32e to 32h are enabled. At the same time, a signal from the "m" output terminal of the counter circuit 30 is supplied to the set input terminal S of the FF circuit 25b to invert the Q output of the circuit 25b to the "H" level. As a result, the transistor 28 is rendered to be conductive, so that a pulse output from the clock pulse generator 27 is applied via the transistor 28 to the clock input terminal of the JKFF circuit 28a, thereby periodically energizing the circuit 28a. The generation time interval of the output pulse of the clock pulse generator 27 is set to a value which is slightly larger than half the duration of the position detection signal 50a.

The JKFF circuit 28b, which receives at its clock input terminal a $\overline{Q}$ output of the circuit 28a, supplies a one-phase stepping drive signal from the Q output terminal and $\overline{Q}$ output terminal thereof, and the JKFF circuit 28c supplies another phase stepping drive signal, which has a phase different by 90 degrees from the former stepping drive signal, in response to the Q output of the circuit 29a. These 2-phase stepping outputs, which are represented by rectangular wave signals 50a, 50b, ..., signals 52a, 52b, ..., signals 51a, 51b, ... and signals 53a, 53b, ..., are supplied to the energization control circuit 340 via and AND circuits 32e to 32h and OR circuits 33a to 33d. As a result, the motor 200 having been operated as a 2-phase reluctance motor functions as a 2-phase stepping motor.

Further, in order to prevent occurrence of hunting in the motor 200 upon transition from the constant driving mode to the stepping driving mode, a stepping drive signal for permitting the motor 200 to be rotated in the same direction as the motor rotation direction at the time of the transition is supplied to the exciting coil which is energized at the time of the transition. For example, in case that a position detection signal is supplied to the energization control circuit 340 via the output terminal 34a of the driving mode switching circuit 330, a differential pulse generated at the time of rise of the position detection signal is supplied from a differentiating circuit (not shown) connected between the terminals 29a and 34a of the switching circuit 330 to the terminal 29a. A Q output from the FF circuit 28b set by the differential pulse is supplied from the terminal 34a to the energization control circuit 340 via the AND circuit 32h whose gate is enabled in response to the $\overline{Q}$ output from the FF circuit 25a which is reset at the time of transition to the stepping driving mode, and via the OR circuit 33a. On the other hand, the gates of the AND circuits 32a to 32d are disabled at the time of transition to the stepping driving mode, so that the position detection signal will be prevented from being supplied to the energization control circuit via the AND circuit 32a and OR circuit 33a. When the clock pulse is generated from the clock pulse generator 27 while the stepping drive signal is being supplied via the terminal 34a, the Q output from the FF circuit 28b is inverted to the "L" level so that a signal supplied to the terminal 34a is extinguished. At this time, the Q output (stepping drive signal) generated from the FF circuit 28c in response to the Q output of the FF circuit 28a is supplied to the terminal 34b via the AND circuit 32f and OR circuit 33b. Thereafter, each time a clock pulse is generated, a desired stepping drive signal is supplied to the energization control circuit 340.

Subsequently, when the count of the counter circuit 30 has reached "0", i.e., when the driven member has reached the target position, the FF circuit 25b is reset by a signal from the "0" output terminal of the counter circuit 30, so that the Q output of the circuit 25b is inverted to the "L" level to turn off the transistor 28. As a result, stepping outputs from the JKFF circuits 28b and 28c are terminated. Therefore, the motor 200 stops its 2-phase stepping operation to stop the forward movement of the ball screw/nut mechanism 100 and the driven member E integrally therewith, whereby the driven member E is precisely positioned to the target position. In other words, the control unit performs numerical control in accordance with a positioning command supplied from the computer 35.

As described above, the driven member E is driven, via the ball screw/nut mechanism, by means of the motor 200 which rotates at a high speed until the stored value of the counter circuit 30 which is counted down as the driven member E moves has reached the first preset value "n". As a result, the driven member E can be driven at a high speed by a large thrust of 10 to 1000 kg, for example. When the remaining count of the counter 30 has reached the first preset value "n", the driving mode of the motor is changed from the high speed driving mode to the deceleration driving mode without causing noise, then the motor is driven at a constant speed. When the count has reached the second preset value "m", the motor is driven in the stepping driving mode. The present values "n" and "m" are determined to optimum values in light of a thrust required for moving the driven member E and the inertia of the driven member in the movement, and the traveling distance in one step in the stepping action is set at a small value. For this reason, the positioning precision is excellent. The driving force is increased by the use of the ball screw/nut mechanism 100, so that the driving force never be insufficient even if the traveling distance per one step is set to a small value. Meanwhile, it is also possible to automatically set the optimum values of the first and second preset values "n" and "m" by use of the computer 35 having a learning function, so as to position the driven member E to the target position in the shortest time.

In case that the target moved position of the driven member E is smaller than the actual position at the time of storing the target position data into the counter circuit 30, the driven member E is moved backward towards the target position. In this case, a control signal from the computer 35 is supplied to the terminal 26b of the driving mode switching circuit 330 to set the Q output of the FF circuit 26 to the "L" level. As a result, the motor 200 is first driven in a reverse direction, and when the remaining count of the counter circuit 30 has reached the first preset value "n", the driving mode is changed to the forward rotation mode, so that the motor is driven while being decelerated. Then, as in the case of forwardly moving the driven member E, the motor is driven at a constant speed and then driven in the stepping driving mode, and when the driven member has reached the target position, the operation of the motor is stopped.

The present invention is not limited to the foregoing embodiment, and various modification thereof may be made.

Figure 11:
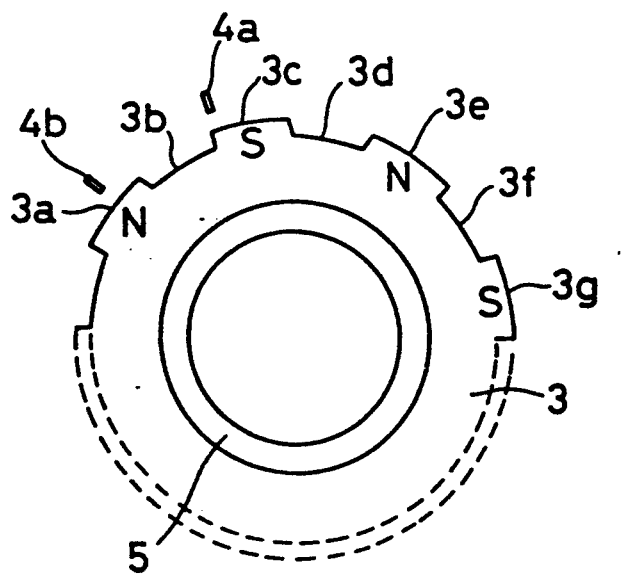
FIG. 11 is a schematic side view showing, partly omitted, a modification of the position detection element.

For example, in the embodiment, three teeth are formed on each magnetic pole, but the number of teeth is not limited to three and can be one or two, for example. However, in order to prevent damage of the ball of the ball screw/nut mechanism, it is preferable to form at least two teeth on each magnetic pole, if the motor is used in combination with the ball screw/nut mechanism. With the motor having n teeth formed on each magnetic pole, it is possible to obtain a torque n times that of the motor having a single tooth formed on each magnetic pole. When a large number of teeth are formed on each magnetic pole, the width of the salient pole and the diameter of the detection coil must be made small. However, since the detection precision is lowered when the diameter of the detection coil is made small, a position detector element formed of a magnetic resistance element is used instead of the detection coil, where required. In an example shown in FIG. 11, magnetic resistance elements 4a and 4b are formed of magnetic elements of semiconductor elements, and are disposed to be separated by (90+180) degrees from each other. The magnetic resistance elements 4a, 4b are disposed in facing relation to protuberances 3a, 3c, . . . , e.g., ten protuberances, formed on the outer peripheral surface of a cylindrical plastic magnet 3, with a gap between the elements and the protuberance, the motor being fixed on the hollow rotary shaft 5 of the motor. These protuberances are magnetized with polarities shown in FIG. 11. Reference numerals 3a, 3b, . . . indicate concave portions formed on the outer peripheral surface of the magnet and having the same width as that of the protuberances. When the rotary shaft 5 rotates in the clockwise direction, the same signals as those in the above embodiment are supplied from the magnetic resistance elements 4a and 4b.

Figure 8J:
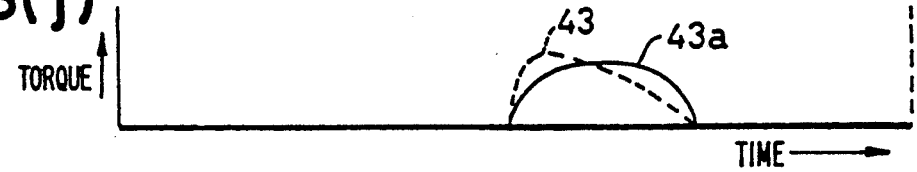

In the embodiment, energization is started when the salient pole has entered the magnetic pole by 45 degrees in the motor having the torque characteristic shown by the curve 43a in FIG. 8(j). To attain the maximum torque in the motor having the torque characteristic shown by the curve 43, however, energization is started when the salient pole has entered the magnetic pole. In this case, the motor is driven forwardly by supplying the position detection signals 54a, . . . , signals 55a, . . . , signals 56a, . . . and signals 57a, . . . to the input terminals 41a to 41d of the energization control circuit 340, respectively. For reverse rotation of the motor, signals which are obtained by delaying the above four sets of position detection signals by 90 degrees, i.e., the position detection signals 57a, . . . , signals 54a, . . . , signals 55a, . . . and signals 56a, . . . are respectively supplied to the input terminals 41a to 41d.

Figure 12:
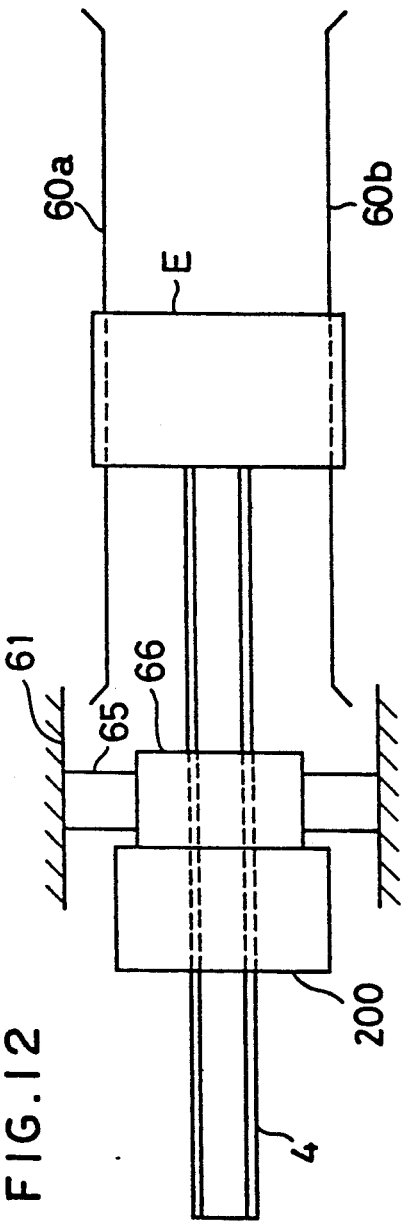
FIG. 12 is a view schematically showing a modification of the ball screw/nut mechanism.
Figure 13:
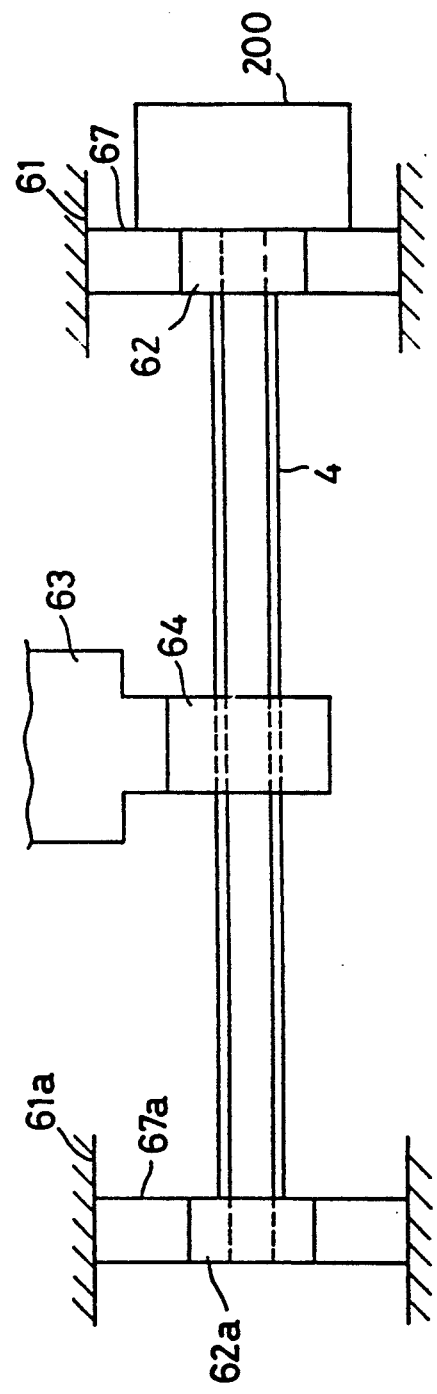
FIG. 13 is a view schematically showing another modification of the ball screw/nut mechanism.

Further, in the embodiment, the ball screw/nut mechanism 100 shown in FIG. 1 is used, but the ball screw/nut mechanism can be modified as shown in FIGS. 12 and 13, for example. In FIG. 12, an outer casing 66, fixed on the motor 200 and accommodating therein a ball nut (not shown), is fixed on a frame 61 through a support member 65, and the driven member E is mounted for movement along guides 60a and 60b. When the ball nut is rotated with rotation of a hollow rotary shaft (not shown) of the motor, a ball screw 4 disposed within the hollow rotary shaft and the driven member E fixed to one end of the ball screw are moved in the axial direction. In FIG. 13, the motor 200 is fixed on a frame 61 via a support member 67, and a support member 67a is fixed on a frame 61a. Ball bearings 62 and 62a supported by these support members 67, 67a rotatably supports the opposite ends of a ball screw 4. A support base 63 on which a driven member (load), not shown, is disposed is arranged for slidable motion along guides (not shown), and is connected to a casing 64 accommodating therein a ball nut (not shown) which is threadedly engaged with the ball screw 4. When the ball screw 4 is rotated with rotation of the rotary shaft (not shown) of the motor 200, the driven member E is moved along the ball screw 4 together with the ball nut, casing 64 and support base 63.

We claim:

1. A control unit for controlling exciting coils of an electric motor having a rotor, comprising:
    a position detector for sequentially generating a series of position detection signals upon rotation of the rotor of the electric motor;
    a stepping signal generator for sequentially generating a series of stepping signals;
    an energization control circuit operatively connected to the electric motor to energize and de-energize the exciting coils of the electric motor in response to the series of position detection signals and the series of stepping signals;
    a counter circuit of a driving mode switching circuit operatively connected to said energization control circuit to command operation of the electric motor from a normal driving mode to a deceleration driving mode and then from the deceleration driving mode to a stepping driving mode in response to values indicative of the series of position detection signals;
    a position signal switching circuit operatively connected to said counter circuit of said driving mode switching circuit and said position detector to supply the series of position detection signals to said energization control circuit when said counter circuit of said driving mode switching circuit commands a normal driving mode and to alter a sequence of the series of position detection signals to supply an altered series of position detection signals to said energization control circuit when said counter circuit of said driving mode switching circuit commands the deceleration driving mode; and
    a driving signal switching circuit of said driving mode switching circuit operatively connected to said position signal switching circuit, said counter circuit, said stepping signal generator and said energization control circuit to interrupt supply of the altered series of position detection signals to said energization control circuit and to supply the series of stepping signals to said energization control circuit when said counter circuit of said driving mode switching circuit commands the stepping driving mode.

2. A control unit according to claim 1, wherein said position detector includes two position detection elements fixed on a stationary armature of the electric motor and separated from each other, said position detection elements being operable to sequentially generate the series of position detection signals which continuously follow one another without overlapping.

3. A control unit according to claim 2, wherein each of said position detection elements is disposed at a position at which said each position detection element is permitted to generate a pulse of the series of position detection signals when an associated one of salient poles of the rotor faces a corresponding one of magnetic poles of said stationary armature by a preset electric angle.

4. A control unit according to claim 1, wherein said energization control circuit includes a chopper circuit operatively connected to the electric motor to de-energize an energized one of the exciting coils when an exciting current flowing therethrough exceeds a first preset value and to energize the thus de-energized one of the exciting coils when a current flowing therethrough has decreased to a second preset value.

5. A control unit according to claim 1, wherein said energization control circuit includes means for supplying magnetic energy stored in one of the exciting coils when the one of the exciting coils is de-energized in response to extinction of a position detection signal corresponding to an exciting coil to be energized by a next position detection signal, so that the exciting current flowing through the de-energized one of the exciting coils rapidly falls, and the exciting current flowing through the one of the exciting coils to be energized rapidly rises.

6. A control unit according to claim 1, wherein said energization control circuit includes regeneration means for regenerating electric power caused by a counter-electromotive force generated in one of the exciting coils which is in an energized state at the time of transition from the normal driving mode to the deceleration driving mode occurs from the normal driving mode to the deceleration driving mode to brake said electric motor.

7. A control unit according to claim 1, wherein said counter circuit is operatively connected to decrement a count each time a pulse of the position detection signal is generated, an initial value of the count being supplied from a host control unit and indicative of the target position, said counter circuit being operatively connected to command operation the driving mode from the normal driving mode to the deceleration driving mode when the count has decreased to a first predetermined value and to command operation from the deceleration driving mode to the stepping driving mode when the count has decreased to a second predetermined value; and
    wherein said driving signal switching circuit is operatively connected to interrupt supply of the series of stepping signals to said energization control circuit when said count reaches a zero value to stop the electric motor.

8. A control unit according to claim 1, wherein said counter circuit is operatively connected to count each time a pulse of the position detection signal is generated, an initial value of the count being supplied from a host control unit and indicative of the target position, said counter circuit being operatively connected to command operation from the normal driving mode to the deceleration driving mode when the count has decreased to a first predetermined value and to command operation from the deceleration driving mode to the stepping driving mode when the count has decreased to a second predetermined value.

9. A control unit according to claim 8, wherein said energization control circuit includes a chopper circuit operatively connected to the electric motor to de-energize an energized one of the exciting coils when an exciting current flowing therethrough exceeds a first preset value and to energize the thus de-energized one of the exciting coils when a current flowing therethrough has decreased to a second preset value.

10. A control unit according to claim 9, wherein said chopper circuit is operatively connected to said electric motor to de-energize an energized one of the exciting coils when an exciting current flowing therethrough exceeds the second preset value after a rotation speed of the electric motor is decreased to a preset rotation speed in the deceleration driving mode and to energize the thus de-energized one of the exciting coils when a current flowing therethrough has decreased to a third preset value so that the electric motor is driven at a predetermined rotation speed.

11. A control unit according to claim 1, wherein said driving signal switching circuit interrupts supply of the series of stepping signals to said energization control circuit when said count reaches a zero value to stop the electric motor.

12. A control unit according to claim 1, further comprising a differential pulse circuit operatively connected to said position detector to differentiate the series of position detection signals and provide to said counter circuit the values indicative of the series of position detection signals.

13. A drive system, comprising:
an electric motor having exciting coils and a rotor;
a drive unit rotatably connected to said electric motor to drive a load with a driving force obtained by amplifying a force output of said electric motor; and
a control unit for controlling said electric motor, wherein said control unit includes:
a position detector for sequentially generating a series of position detection signals upon rotation of the rotor of the electric motor;
a stepping signal generator for sequentially generating a series of stepping signals;
an energization control circuit operatively connected to the electric motor to energize and de-energize the exciting coils of the electric motor in response to the series of position detection signals and the series of stepping signals;
a counter circuit of a driving mode switching circuit operatively connected to said energization control circuit to command operation of the electric motor from a normal driving mode to a deceleration driving mode and then from the deceleration driving mode to a stepping driving mode in response to values indicative of the series of position detection signals;
a position signal switching circuit operatively connected to said counter circuit of said driving mode switching circuit and said position detector to supply the series of position detection signals to said energization control circuit when said counter circuit of said driving mode switching circuit commands a normal driving mode and to alter a sequence of the series of position detection signals to supply an altered series of position detection signals to said energization control circuit when said counter circuit of said driving mode switching circuit commands the deceleration driving mode; and
a driving signal switching circuit of said driving mode switching circuit operatively connected to said position signal switching circuit, said counter circuit, said stepping signal generator and said energization control circuit to interrupt supply of the altered series of position detection signals to said energization control circuit and to supply the series of stepping signals to said energization control circuit when said counter circuit of said driving mode switching circuit commands the stepping driving mode.

14. A drive system according to claim 13, wherein said drive unit includes a ball screw/nut mechanism having a ball screw and a ball nut threadedly engaged therewith, one of said ball screw and said ball nut being rotatably coupled to the rotor of said electric motor and another being drivingly coupled to said load.

* * * * *

UNITED STATES PATENT AND TRADEMARK OFFICE
CERTIFICATE OF CORRECTION

PATENT NO. : 5,194,795

DATED : March 16, 1993

INVENTOR(S) : Bahn et al.

It is certified that error appears in the above-identified patent and that said Letters Patent is hereby corrected as shown below:

Column 4, line 14, change "E" to --$\underline{E}$--;

line 21, change "E" to --$\underline{E}$--;

line 28, change "E" to --$\underline{E}$--;

line 50, change "G" to --$\underline{G}$--;

line 53, change "F" to --$\underline{F}$--.

Column 5, line 8, change "K" to --$\underline{K}$--;

line 13, change "L,M and N" to --$\underline{L}$, $\underline{M}$ and $\underline{N}$--.

line 43, change "E" to --$\underline{E}$--;

Column 7, line 49, change "Q" to --$\underline{Q}$--;

line 51, change "Or" to --OR--;

line 58, change "C" to --$\underline{C}$--;

line 62, change "R" to --$\underline{R}$--;

line 68, change "C" to --$\underline{C}$--.

Column 8, line 1, change "S" to --$\underline{S}$--;

line 2, change "R" to --$\underline{R}$--;

line 4, change "Q" to --$\underline{Q}$--;

UNITED STATES PATENT AND TRADEMARK OFFICE
CERTIFICATE OF CORRECTION

PATENT NO. : 5,194,795

DATED : March 16, 1993

INVENTOR(S) : Bahn et al.

It is certified that error appears in the above-identified patent and that said Letters Patent is hereby corrected as shown below:

line 12, change "Q" to --$\underline{Q}$--;

line 13, change "S" to --$\underline{S}$--;

line 14, change "R" to --$\underline{R}$--;

line 23, change "Q" to --$\underline{Q}$--;

line 29, change "Q" to --$\underline{Q}$--;

line 34, change "$\overline{Q}$" to --$\underline{Q}$--;

line 51, change "K and L" to --$\underline{K}$ and $\underline{L}$--;

line 54, change "B and C" to --$\underline{B}$ and $\underline{C}$--;

line 56, change "M and N" to --$\underline{M}$ and $\underline{N}$--.

Col. 9, line 4, change "K to N" to --$\underline{K}$ to $\underline{N}$--;

line 7, change "K to N" to --$\underline{K}$ to $\underline{N}$--;

line 40, change "E" to --$\underline{E}$--;

line 41, change "E" to --$\underline{E}$--;

line 50, change "R" to --$\underline{R}$--;

line 51, change "Q" to --$\underline{Q}$--.

Col. 10, line 8, change "K to N" to --$\underline{K}$ to $\underline{N}$--;

UNITED STATES PATENT AND TRADEMARK OFFICE
CERTIFICATE OF CORRECTION

PATENT NO. : 5,194,795  
DATED : March 16, 1993  
INVENTOR(S) : Bahn et al.

It is certified that error appears in the above-indentified patent and that said Letters Patent is hereby corrected as shown below:

line 21, change "E" to --$\underline{E}$--;

line 25, change "L" to --$\underline{L}$--;

line 27, change "M" to --$\underline{M}$--;

line 31, change "A" to --$\underline{A}$--;

line 33, change "L" to --$\underline{L}$--;

line 34, change "N" to --$\underline{N}$--;

line 38, change "N" to --$\underline{N}$--;

line 39, change "S" to --$\underline{S}$--;

line 47, change "N and S" to --$\underline{N}$ and $\underline{S}$--;

line 48, "N and S" to --$\underline{N}$ and $\underline{S}$--.

Col. 11, line 7, change "portion" to --portions--;

line 59, change "A" to --$\underline{A}$--;

line 60, change "G, H, J and P" to --$\underline{G}$, $\underline{H}$, $\underline{J}$ and $\underline{P}$--;

line 61, change "G and P" to --$\underline{G}$ and $\underline{P}$--;

UNITED STATES PATENT AND TRADEMARK OFFICE
CERTIFICATE OF CORRECTION

PATENT NO. : 5,194,795

DATED : March 16, 1993

INVENTOR(S) : Bahn et al.

It is certified that error appears in the above-indentified patent and that said Letters Patent is hereby corrected as shown below:

line 65, change "G" to --$\underline{G}$--;

line 66, change "P" to --$\underline{P}$--;

line 68, change "H and J" to --$\underline{H}$ and $\underline{J}$--.

Col. 12, change "G, H, J" to --$\underline{G}$, $\underline{H}$, $\underline{J}$--;

line 3, change "P" to --$\underline{P}$--;

\*     line 16, change "8(j)" to --8(i)--;

\*     line 22, change "8" to --8(i)--;

line 45, change "9(a)" to --9(a)-9(c)--;

line 51 (both occurrences), change "K" to --$\underline{K}$--.

Col. 13, line 37, change "L" to --$\underline{L}$--;

line 38, change "K" to --$\underline{K}$--;

line 39, change "L" to --$\underline{L}$--;

line 40, change "K" to --$\underline{K}$--;

line 43, change "L" to --$\underline{L}$--.

Col. 14, line 12, change "E" to --$\underline{E}$--;

UNITED STATES PATENT AND TRADEMARK OFFICE
CERTIFICATE OF CORRECTION

PATENT NO. : 5,194,795           Page 5 of 8
DATED      : March 16, 1993
INVENTOR(S): Bahn et al.

It is certified that error appears in the above-indentified patent and that said Letters Patent is hereby corrected as shown below:

line 16, change "Q" to --$\underline{Q}$--;

line 54, change "K" to --$\underline{K}$--;

line 55, change "E" to --$\underline{E}$--;

line 58, change "K" to --$\underline{K}$--, after "voltage" insert --$\underline{V}$--;

line 59, change "V" to --$\underline{V}$--;

line 60, change "E" to --$\underline{E}$--;

line 61, change "K" to --$\underline{K}$--;

line 62, change "K" to --$\underline{K}$--.

Col. 15, line 1, change "K" to --$\underline{K}$--;

line 3, change "K" to --$\underline{K}$--;

line 14, change "(22a" to --22a--;

line 31, change "E" to --$\underline{E}$--;

line 36, change "changed" to --charged--;

line 59, change "Q" to --$\underline{Q}$--.

UNITED STATES PATENT AND TRADEMARK OFFICE
CERTIFICATE OF CORRECTION

PATENT NO. : 5,194,795
DATED : March 16, 1993
INVENTOR(S) : Bahn et al.

It is certified that error appears in the above-indentified patent and that said Letters Patent is hereby corrected as shown below:

Col. 16, line 4, change "Q" to --$\overline{Q}$--;

line 8, change "R" to --$\underline{R}$--;

line 16, change "S" to --$\underline{S}$--;

line 17, change "Q" to --$\overline{Q}$--;

line 28, change "Q" to --$\overline{Q}$--;

line 32, change "Q" to --$\overline{Q}$--;

line 55, change "Q" to --$\overline{Q}$--;

line 68, change "Q" to --$\overline{Q}$--.

Col. 17, line 3, change "Q" to --$\overline{Q}$--;

line 5, change "Q" to --$\overline{Q}$--;

line 20, change "E" to --$\underline{E}$--;

line 21, change "E" to --$\underline{E}$--;

line 25, change "E" to --$\underline{E}$--;

line 29, change "E" to --$\underline{E}$--;

line 30, change "E" to --$\underline{E}$--;

line 41, change "E" to --$\underline{E}$--;

UNITED STATES PATENT AND TRADEMARK OFFICE
CERTIFICATE OF CORRECTION

PATENT NO. : 5,194,795
DATED : March 16, 1993
INVENTOR(S) : Bahn et al.

It is certified that error appears in the above-indentified patent and that said Letters Patent is hereby corrected as shown below:

line 52, change "E" to --$\underline{E}$--;

line 55, change "E" to --$\underline{E}$--;

line 57, change "E" to --$\underline{E}$--;

line 60, change "Q" to --$\overline{Q}$--;

line 67, change "E" to --$\underline{E}$--.

Col. 18, line 65, change "E" to --$\underline{E}$--;

Col. 19, line 2, change "E" to --$\underline{E}$--;

line 14, change "E" to --$\underline{E}$--.

UNITED STATES PATENT AND TRADEMARK OFFICE
CERTIFICATE OF CORRECTION

PATENT NO. : 5,194,795

DATED : March 16, 1993

INVENTOR(S) : Bahn et al

It is certified that error appears in the above-indentified patent and that said Letters Patent is hereby corrected as shown below:

Column 20, line 33, after "mode" insert --when a transition --.

Signed and Sealed this

Twelfth Day of April, 1994

BRUCE LEHMAN

*Commissioner of Patents and Trademarks*

*Attest:*

*Attesting Officer*